Figure 1:
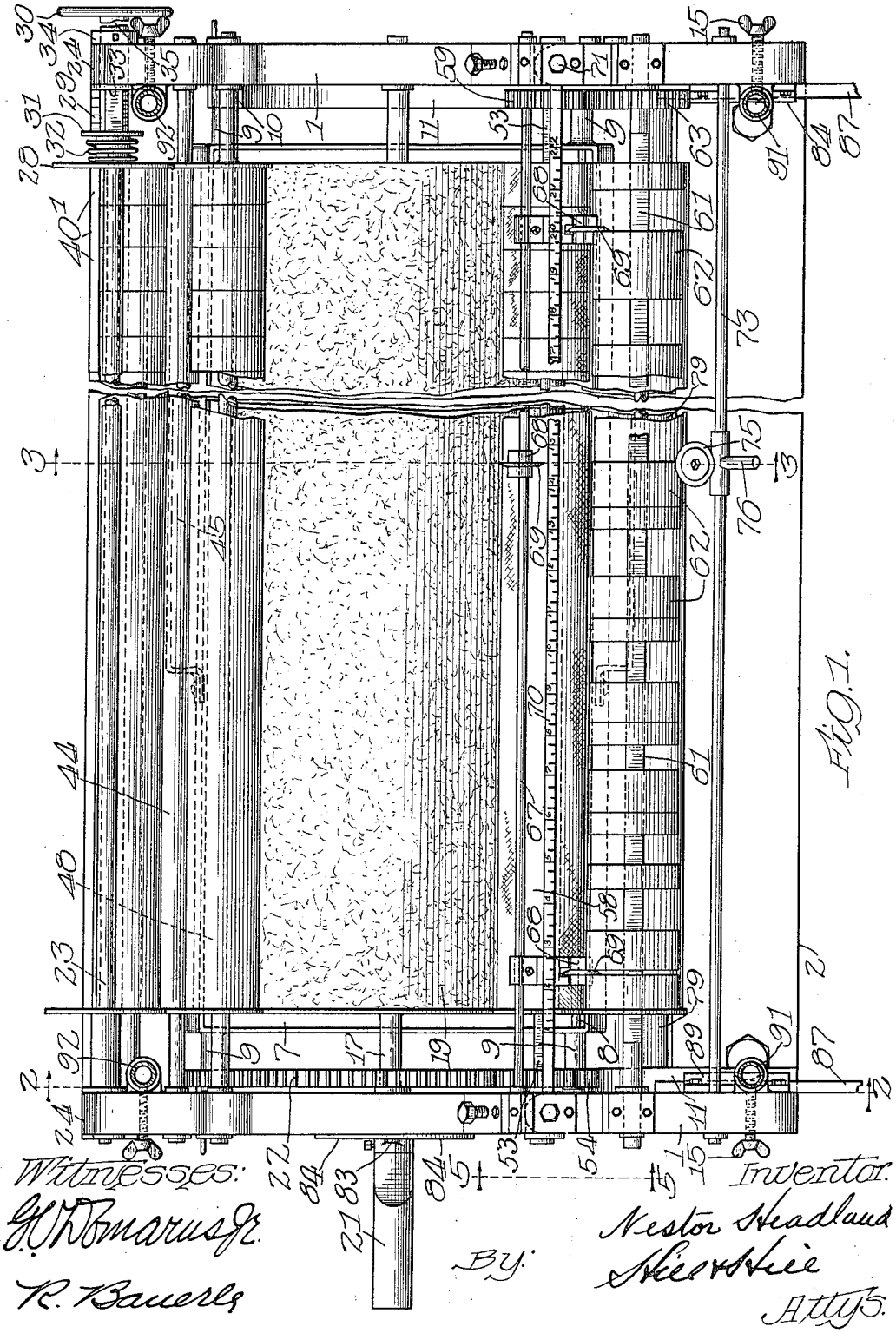

N. HEADLAND.
MACHINE FOR PASTING, TRIMMING, AND CUTTING WALL PAPER.
APPLICATION FILED JAN. 10, 1913.

1,154,015. Patented Sept. 21, 1915.
5 SHEETS—SHEET 1.

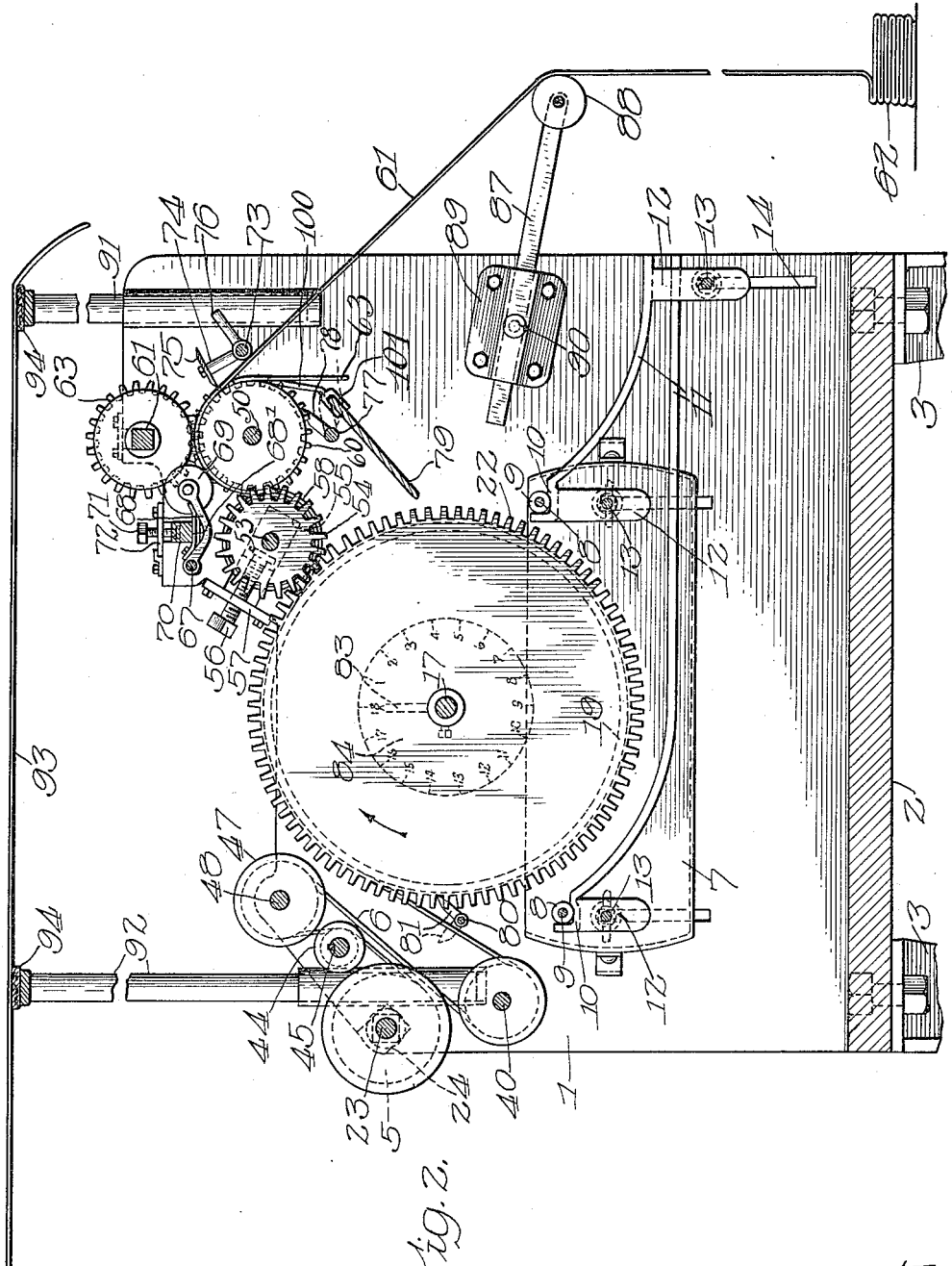

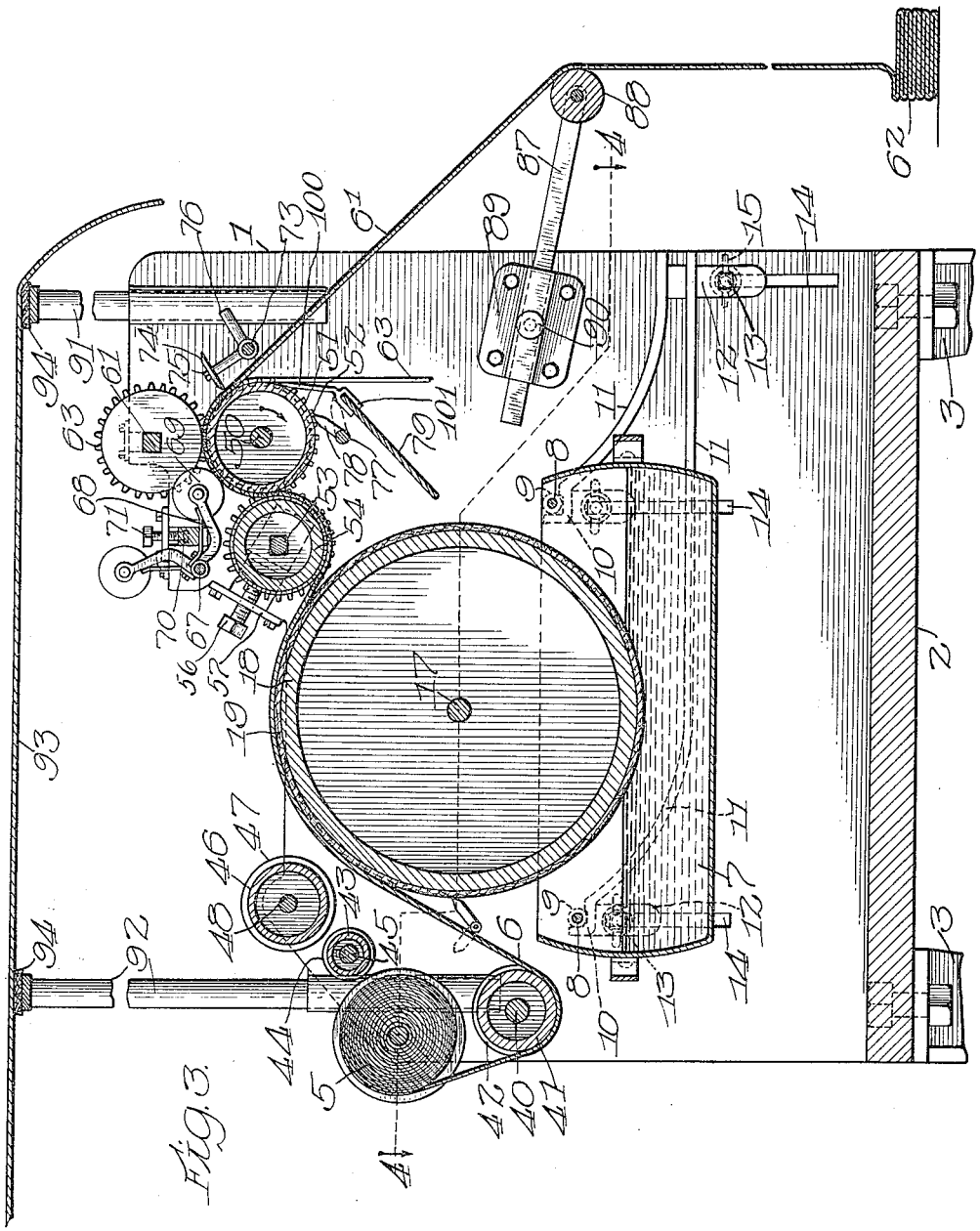

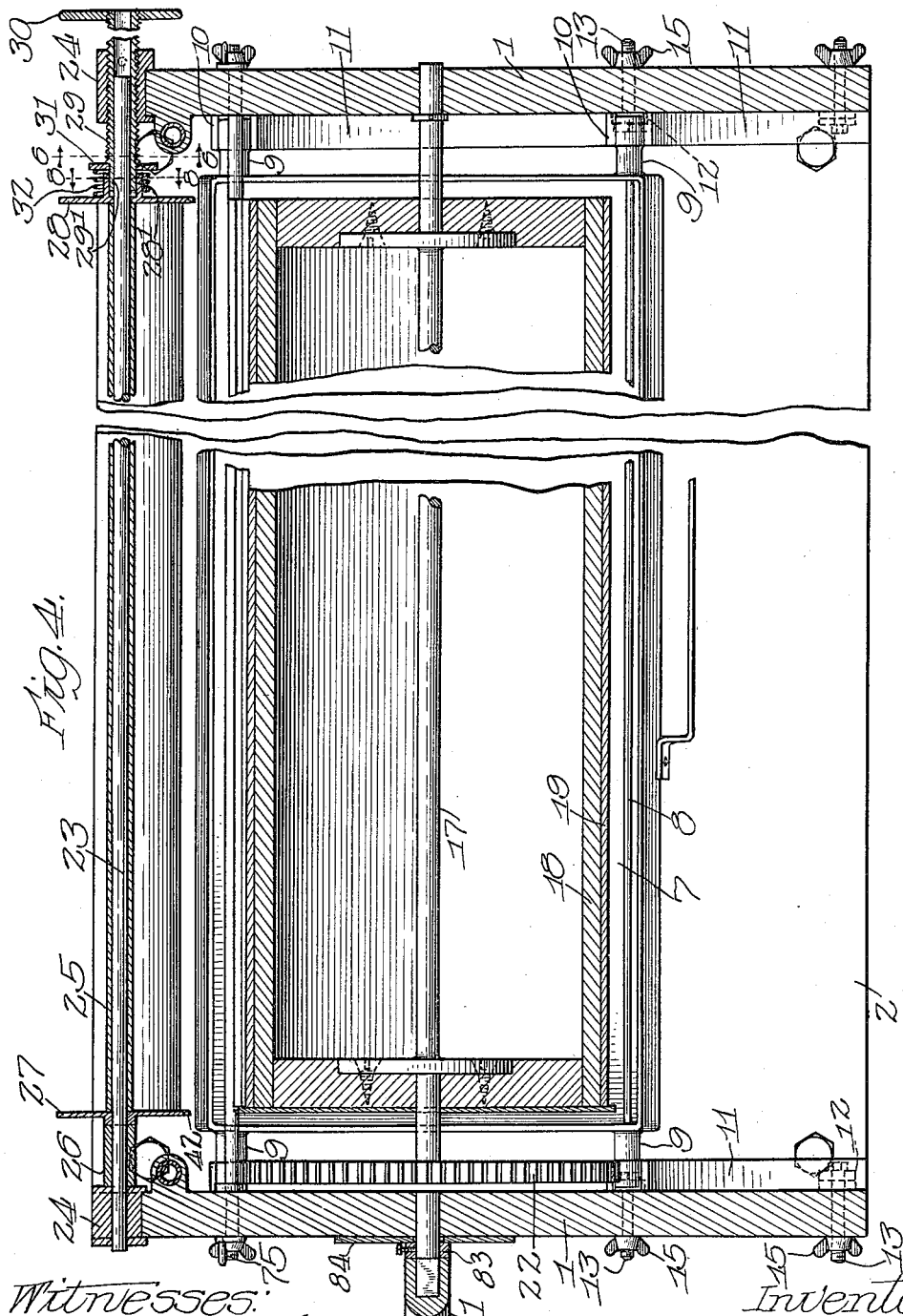

N. HEADLAND.
MACHINE FOR PASTING, TRIMMING, AND CUTTING WALL PAPER.
APPLICATION FILED JAN. 10, 1913.
1,154,015.
Patented Sept. 21, 1915.
5 SHEETS—SHEET 5.
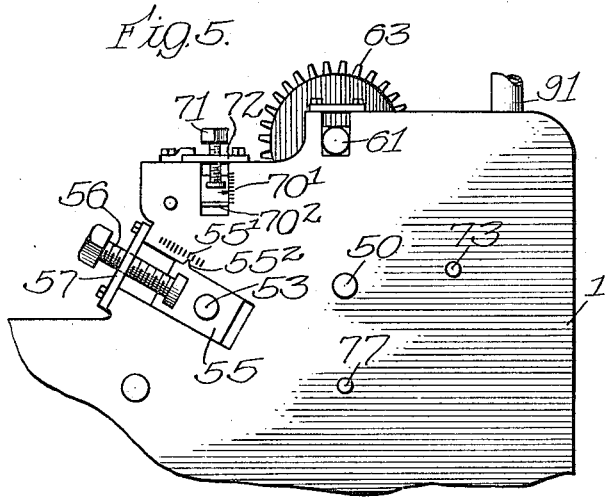
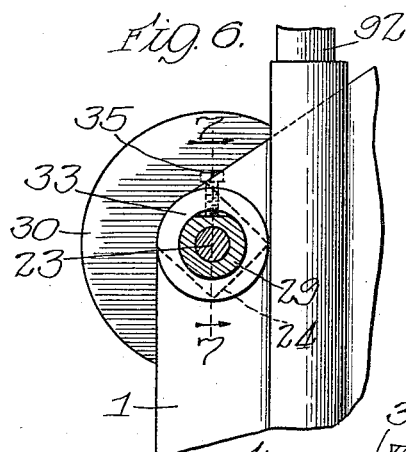
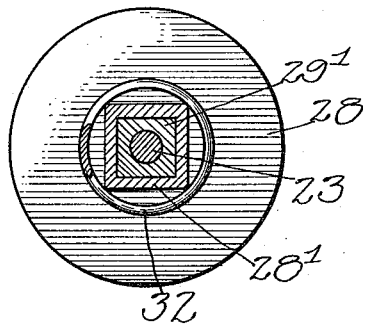
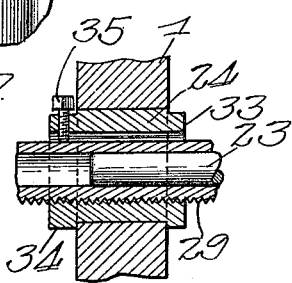

UNITED STATES PATENT OFFICE.

NESTOR HEADLAND, OF CHICAGO, ILLINOIS.

MACHINE FOR PASTING, TRIMMING, AND CUTTING WALL-PAPER.

1,154,015.　　　　　Specification of Letters Patent.　　Patented Sept. 21, 1915.

Application filed January 10, 1913. Serial No. 741,362.

*To all whom it may concern:*

Be it known that I, NESTOR HEADLAND, a subject of Finland and the Czar of Russia, residing at Chicago, in the county of Cook and State of Illinois, have invented certain new and useful Improvements in Machines for Pasting, Trimming, and Cutting Wall-Paper, of which the following is a description.

My invention belongs to that general class of devices intended to facilitate the hanging of wall paper or the like, and relates particularly to a device for evenly applying and distributing the desired amount of paste to the wall paper, for trimming one or both edges of the paper, cutting the same lengthwise into strips, if desired, and for indicating the length of paper to be cut off, and cutting the same at the desired point.

The invention has among its objects the production of a device of the kind described that is simple, compact, durable, efficient, and satisfactory, that may be used wherever found applicable. With the device, injury to the paper, either by wrinkling or creasing, or by smearing paste upon the front of the paper, is prevented, and the paper is accurately trimmed and cut for the purpose intended.

To this end my invention consists in the novel construction, arrangement and combination of parts herein shown and described, and more particularly pointed out in the claims.

In the drawings, wherein like reference characters indicate like or corresponding parts, Figure 1 is a top plan view of my improved device, the paper being removed. Fig. 2 is a sectional view taken substantially on line 2, 2 of Fig. 1. Fig. 3 is a sectional view taken substantially on line 3, 3 of Fig. 1. Fig. 4 is a sectional view taken substantially on line 4, 4 of Fig. 3. Fig. 5 is an end elevation with a portion of the device looking substantially on the line 5, 5 of Fig. 1. Fig. 6 is a cross sectional view taken substantially on line 6, 6 of Fig. 4. Fig. 7 is a sectional view taken substantially on line 7, 7 of Fig. 6, and Fig. 8 is a cross sectional view taken substantially on line 8, 8 of Fig. 4.

Referring to the drawings, in which the preferred form of my device is shown, a frame is provided having end pieces 1, 1, and a bottom piece 2, which may be provided with the legs 3, if desired. Ordinarily, however, the legs 3 are not required, as the machine may be placed upon the floor, or upon a table, or other support.

In the drawing, 5 represents a roll of wall paper, a portion 6 of which is run off the roll 5, the end portion 6' being discharged from the machine, trimmed, and pasted, ready for hanging, and if desired, folded or piled, as at 6². The trimmings 6³ are discharged where they may be gathered up and removed.

Arranged between the end 1 of the frame is a suitable paste tank or receptacle 7. The paste receptacle is detachable from the frame, and is preferably arranged so that it may be transversely moved into position, and at the same time elevated to the paste roll or applier, as hereafter described. The paste receptacle, or its support, may also be adjustable, so that the receptacle may be supported at the desired height relative the paste roll. The receptacle shown is provided with a plurality of pins 8 at each end, each of which has a roller 9 arranged thereon. Brackets 10 are provided, one for each roller 9, which are extended as at 11 to substantially form tracks, and are secured to brackets 12, which are secured to the sides of the frame by thumb screws or bolts 13. The bolts 13 pass through slots 14 in the sides of the frame and are provided at the outer ends with the winged nuts 15, or the equivalents, so that the supports may be secured at the desired points. As is obvious, when the paste receptacle is moved in between the ends 1, 1 of the frame, and supported on tracks 11, the transverse movement of the same causes it to be elevated up to the brackets 10, which are substantially formed with notches or pockets to prevent the receptacle from sliding back.

Rotatably mounted above the paste receptacle on a shaft 17 is arranged a paste roll, or paste applier 18, which is provided with a suitable paste carrying face or surface 19 of felt, or any equivalent material for the purpose. It will be noted that the paste roll projects into the paste receptacle, so that as the roll is rotated in the direction indicated by the arrow in Fig. 2, it becomes coated with paste and applies a coating of paste to the plain or blank side of the paper 6.

The roll of wall paper 5 is arranged upon a core 25, mounted upon a shaft 23 (see Fig. 4) which shaft is detachably mounted in detachable bearings or blocks 24. The core 25 is provided with a flange 27 at the end, and is maintained in the desired position relative the paste roll, by the spacer 26. At the opposite end of the core is arranged an adjustable flange 28, the same being provided with means for maintaining the same in contact with the end of the roll, so that it substantially acts as a brake and prevents the paper from being drawn off too rapidly, or the roll spinning. The core may be sliced or sectioned, as are some of the rolls hereafter described, or an assortment of cores of different lengths provided for use with paper of different widths. Referring particularly to Figs. 4, 6, 7 and 8, the end of shaft 23 is provided with an adjustable tubular end 29, into which the end of shaft 23 extends, which part 29 extends through the bearing block 24, and is provided with a hand wheel 30 for adjustment. The end 29 is preferably squared as at 29', as shown in Fig. 8, and upon the end is mounted a collar 31 and the flange 28 having an extended part 28'. Between the two is positioned a spring 32. As is obvious, when the hand wheel 30 is turned, the flange 28 may be pushed toward the flange 27. This permits an adjustment for different widths of wall paper, and also permits the variation in the pressure upon the end of the roll, since the tension of the spring 32 may be made as desired.

As most clearly shown in Figs. 6 and 7, the block 24 is provided with flanges 33 and 34 and a set screw 35, provided for locking the part 29, and preventing its rotation. Any equivalent construction for the purpose may be employed. Arranged proximate the paper carrier is what may be termed a feeding or alining roll 41, which is mounted upon a shaft 40. This roll is preferably provided with a flange 42 at each end, and is provided with a plurality of removable sections 40' at one end, so that the same may be made applicable for any width of wall paper. This will be more fully explained in the operation of the machine. These sections may be termed slices so that the roll may be said to be a sliced roll. Where the paper roll is even or square at the ends, one alining roll is all that is usually required. However, where the roll of paper is not true, there are times when one alining roll will not be sufficient to aline the paper and keep it running straight or true. I have therefore provided rolls 43 and 46 in addition to the roll 41. The roll 43 is mounted upon a shaft 45, and is preferably not rotatable. It is provided with a flange 44 at each end, and also sliced in a manner similar to the roll 41. The roll 46 is rotatably mounted upon a shaft 48 and provided with a flange 47 at each end, and the roll is also preferably sliced similar to the other rolls just described. In Fig. 2 the paper is shown extended over all of the alining rolls, and in Fig. 3 only over roll 41. This is also more fully explained in the description of the operation of the device.

Supported by a shaft 50 is what may be termed a cutter or cutting roll 51, which is preferably provided with a face or surface 52 of zinc, or other suitable material for the purpose. Zinc, however, is found very satisfactory, and preferred for the purpose, inasmuch as it does not dull the cutters as quickly as would a face of steel or similarly hard material, and does not rust. Mounted proximate the paste roll 18 and cutter roll 51, is what I have termed a regulator roll 54, provided with a suitable face. The regulator roll 54 is preferably adjustably mounted so that the position of the same relative the cutter may be as desired. Any adjustable mounting for the same may be provided that is satisfactory for the purpose. As shown, each end of the shaft 53 is mounted or secured in an adjustable bearing block 55 (see Fig. 5) which is maintained in place by a bolt or screw 56 in engagement with a plate 57 secured to the frame. The paste regulator roll 54 may be made of slices, if desired, so that a portion of it may be removed when using the machine for very narrow strips. If it were all one long piece, it would not be so convenient to paste one-half strips without smearing the remaining part of the regulator roll, and consequently, perhaps, the right or front side of the wall paper. If desired, a scale 55', and a pointer $55^2$ may be provided on each side, as shown in Fig. 5, so that the shaft 53 may be alined with the shaft 50 on the cutter roll.

Arranged proximate the cutter roll are one or more cutters 69, the same being preferably adjustably mounted upon a rod or shaft 67, so that they may be placed at the desired point on the cutter roll, or may be turned back out of operative position, as most clearly shown in Fig. 3. To maintain the cutters 69, each of which is secured to an arm 68 in the desired position relative the cutter roll, or in cutting position, I provide each arm with a spring 68', and arrange a bar 70 across the machine arranged to bear down upon all of the springs on arms 68 that are in cutting position. The bar 70 is adjustably mounted at each side of the frame, as clearly shown in Fig. 5, by means of bolts 71 and plates 72. The pressure upon the springs, and consequently the pressure of the cutters upon the cutting roll, may be varied by turning the bolts 71 in the desired direction. In order that the pressure on all of the cutters may be the same, a scale 70' and pointer $70^2$ may be provided at each end of the frame, as illustrated in Fig. 5. I also preferably provide a scale upon the top face of the part 70, as most clearly shown in Fig. 1. It will be noted that the plates 72 may be turned out of position so as to release the bar 70 when it is desired to turn back many of the cutters, or to change the position of the same upon the rod 67. The cutters are intended to trim the paper at each end, or cut it lengthwise at any desired point between the sides. To cut off the paper the desired length, a cutter 75 is provided, the same being movable lengthwise the cutter roll. As shown, the cutter 75 is carried by an arm 74 secured to a shaft or rod 73. The handle 76, for convenience in raising the cutter or operating it, may be provided if desired. It will be particularly noted that the design of the paper may always be conveniently seen by the paper hanger, thereby making it easy to determine where it should be trimmed or cut off.

In the drawings I show a roll 62 mounted above the cutter roll, the same being preferably made in a plurality of substantially short sections, or slices, throughout its length, so that the cutters may enter between the sections. The sections are also slidably mounted upon the shaft 61, which is rotatably mounted in the frame. As most clearly shown in Fig. 2, the shaft 61 is square where it passes through the sections 62, so that as the shaft is rotated, the sections are also rotated.

The shaft 53 upon which the roll 54 is secured is provided with a gear 58, which meshes with the gear 22 on the paste roll shaft 17, to which the operating handle or crank 21 is secured. At the opposite end of the shaft 53 is a gear 59 arranged to mesh with a gear 60 on the shaft 50 and drive the cutter roll. The gear 60 is arranged to mesh with the gear 63 on the shaft 61 and drive the sliced roll 62. It will be noted that the teeth on the gears 22, 58, 59 and 60, are substantially deep so as to allow the adjustments of the shaft 53, as previously described. While the sizes of the gears may be made substantially as shown, or as desired, they are preferably about the proportions shown, and it may be mentioned that the gear 22 being slightly larger than the paste roll 18, the paper has a slightly greater speed than the surface 19 of the paste roll, so that there is substantially a wiping action, which thoroughly distributes the paste upon the paper.

To remove any excess paste on the paste roll, a wiper 81 is secured upon a shaft 80 (see Figs. 2 and 3), and arranged to be controlled from outside of the machine. This wiper is also preferably arranged so that any paste removed by the wiper will drop into the paste receptacle. I also preferably provide a wiper, or excess paste remover, 78, which may be mounted upon a shaft 77.

The purpose of this wiper is to remove excess paste that may accumulate on the cutter roll. The wipers or excess paste removers are preferably arranged so that they may be operated or controlled from the outside of the machine. A chute 79 extending across the machine is also provided for directing the paste removed by the wiper 78 into the paste receptacle. To indicate or measure the paper passing through the machine, a scale 84 may be provided upon the end of the frame (see Fig. 1) having suitable characters thereon, and a pointer 83 upon the shaft 17. In the device shown, when the pointer has traveled once around the dial, eighteen inches of paper has passed through the machine. The finger or pointer 83 is preferably made adjustable so that it may be set at the desired point. It is, of course, obvious that any equivalent measuring device may be employed, and if desired, a counting device used in addition. The counting device affords a convenient way of keeping account of the paper positioned through the machine, and also enables a check to be made upon the amount of paper in the roll of wall paper. The application of a counting device is so obvious to those skilled in the art that I have not considered it necessary to illustrate one.

To file or fold the paper as indicated at $6^2$ in Figs. 2 and 3, I provide an adjustable arm 87 at each side of the machine, between which is arranged a roll 88. The arms 87 are carried by brackets 89 on the frame secured in the desired position by screws 90. The operation of the same is obvious, the weight of the paper causing it to be folded back and forth. I also show an adjustable frame consisting of the uprights 91 and 92, having cross-bars 94, over which the paper (indicated at this point by numeral 93) may be manually pulled or drawn when it is not desired to use the piling roll 88 to fold the paper discharged from the machine. By using the distributing frame just described, the paper hanger can take the paper from the machine at a point above his head, which, in some cases, may be desirable.

The operation of the machine may be briefly described as follows, it being assumed that the paper roll 5 is arranged as shown, and that the same is substantially true at the ends, so that it will run off true relative the roll. In this case it is extended over the roll 41, over the paste roll, under the regulator roll, and between that and the cutter roll, and over the cutter roll between that and the sliced roll, the paste receptacle having been previously slid into position and elevated to its supporting brackets. The several cutters 69 are positioned at the desired trimming or cutting points, those not desired being turned back out of operative position. It may be assumed that the cutters 69 are adjusted in the desired position and the cutter 75 thrown off. The pointer 83 is set to the starting point. If the crank is turned, the paper is drawn by the regulator and cutting rolls over the paste roll, trimmed, and is discharged as at 6', and neatly piled or folded, if the piling roll 88 is employed. When the desired amount of paper has been reeled off, the cutter 75 is drawn across the cutting roll, cutting off the paper the desired length. If the paper is extended over the auxiliary alining rolls 43 and 46, it is extended substantially as shown in Fig. 2, the additional rolls assisting the roll 41 in alining the paper, so that it will run true. If it is desired to run a narrower paper through the machine than that for which the flanges on the end of the several rolls are set, the flanges may be moved over between the slices, bringing them to the desired point, so as to contact with the two edges of the paper. The various slices or sections shown may be removed from the shafts by removing the shafts from the frame, it being understood, however, that, if desired, the sections may be made detachable from the shafts, or so that they can be readily detached or shifted without removing the shafts, if so desired. I have not considered it necessary to illustrate this. The pressure of the regulator roll 54 and the cutters 69 upon the cutter roll may be varied as found desirable. In order to raise the trimmed edges of the paper from the cutter roll, I employ fingers 100, or their equivalents. These fingers may be mounted upon the frame or at any desired point. As illustrated in the drawings, they are adjustably mounted upon the partition or waste paste carrier 79. They consist of the part 100 having an extended part 101 for clamping the finger to the partition mentioned. As is obvious, they may be positioned where desired, depending upon the position of the cutters. If it is not desired to have the paper run faster than the paste roll, as in the case of a paper that would tear or fracture easily when wet, an additional cover may be placed on the paste roll so as to increase its circumference, so that the circumference, or face, travels at the same rate of speed as the paper.

It will be particularly noted that the machine will paste the paper smoothly, and that the parts can be regulated to any desired width or thickness of paper, or paste on the paper, and for that reason it is satisfactory for any thickness of paper, or wall papers having different surfaces. It will be particularly noted that there is no irregular pulling of the paper by hand, that is by the operator grasping the paper, but with the paper being positively driven by the gears, the paper is piled evenly and regularly. It is adapted to trim the edges of the paper, as well as split or cut the paper lengthwise at any desired point between the edges, and the trimming and cutting will be absolutely true and straight, making it easy for the paper hanger to hang the paper with the seams together. The machine is also adapted to paste and trim the edge of cut-out borders, which work is very difficult when done by hand.

While I have particularly mentioned wall paper, it is obvious that the machine is adapted for pasting and trimming and cutting papers of all kinds and sizes, and pasting and cutting walcrusta, burlaps, and similar wall coverings. It may also be mentioned that in this case it is not absolutely necessary that the wall covering be in the form of a roll 5, as it may pass over the rolls, and thence to the paste roll, with satisfactory results. In all cases the work is efficiently done, both as to the amount of paste and its application or cutting and trimming, so that the paper may be taken from the machine, cut to the correct length and width, and ready for hanging.

Having thus described my invention, it is obvious that various immaterial modifications may be made in the same without departing from the spirit of my invention, hence I do not wish to be understood as limiting myself to the exact form, construction, arrangement or combination of parts herein shown and described, or uses mentioned.

What I claim as new and desire to secure by Letters Patent is:—

1. In a device of the kind described and in combination, a suitable frame, a paper supply roll, said roll provided with adjustable flanges at one end, means for resiliently maintaining said flange in braking contact with the paper carried by said roll, a removable receptacle, a paste roll arranged with a portion in said receptacle, a plurality of paper alining rolls arranged between the paper supply roll and said paste roll, each of said rolls provided with a detachable flange at one end, means for actuating said paste roll and drawing the paper thereover at a speed relatively different to the speed of the roll, means for regulating the amount of paste applied, and means for trimming the pasted paper.

2. In a device of the kind described and in combination, a suitable frame, a paper supply carrier, a paste receptacle, an adjustable support therefor provided with means for elevating the receptacle to its support by a transverse movement of the receptacle, comprising a pair of brackets arranged at each side of the frame, each pair of brackets provided with parallel inclined extensions to one side of the frame, arranged to engage a coöperating part on the receptacle, a paste applier, means for actuating said applier, and feeding the paper thereto, adjustable means for regulating the amount of paste applied, trimming mechanism, and means for guiding and piling the pasted and trimmed paper.

3. In a device of the kind described and in combination, a suitable frame, a paper supply roll, resilient means for retarding the rotation of said supply roll, a detachable paste receptacle, a paste roll, paper alining rolls arranged between the paper supply roll and said paste roll, one of said alining rolls formed in a series of sections, and provided with an adjustable flange at one end, means for actuating said paste roll, and means coöperating therewith for drawing the paper thereover at a relatively different speed than the surface speed of the paste roll, a cutting roll, a plurality of cutters arranged to coöperate therewith to trim the edges of the paper after the paste has been applied thereto, and adjustable means for piling the pasted paper, comprising a roll and means for adjustably supporting said roll.

4. In a device of the kind described and in combination, a suitable frame, a paper carrier, a paste receptacle, an adjustable support therefor provided with means for elevating the receptacle to its support by a transverse movement of the receptacle, comprising a pair of brackets arranged at each side of the frame, each pair of brackets provided with parallel inclined extensions to one side of the frame, arranged to engage a coöperating part on the receptacle, a paste roll, means for actuating said roll and drawing the paper thereover at a relatively different speed than the speed of the face of the roll, a cutting roll provided with a suitable face, a plurality of rotary cutters arranged to coöperate therewith, and adjustable means for piling the pasted paper.

5. In a device of the kind described and in combination, a suitable frame, a paper supply roll, adjustable resilient means for normally retarding the movement thereof, an adjustable paste receptacle, a paste roll, paper alining rolls arranged between the paper supply roll and the paste roll, said alining rolls formed in a series of sections and provided with an adjustable flange at one end, and a fixed flange at the other end, means for rotating said paste roll, and means coöperating therewith for drawing the paper thereover at a speed relatively different than the speed of the face of the roll, a cutting roll provided with a suitable face, a paste distributing roll arranged between said paste roll and said cutting roll, and arranged to coöperate with the cutting roll, a plurality of rotary cutters arranged to coöperate with said cutting shoulder, and provided with means for adjustably carrying the same, and adjustable means for applying the pasted paper in a series of folds, including roll and supporting means therefor.

6. In a device of the kind described and in combination, a suitable frame, a paper carrier, a paste receptacle, means for adjustably supporting said receptacle from the frame, comprising a pair of brackets arranged at each side of the frame, said brackets provided with spaced inclined extensions to one side of the machine, and means for securing said brackets to the frame, a paste roll arranged above said receptacle and projecting therein, means for rotating said paste roll, means arranged between the paste roll and said paper carrier for guiding the paper to the paste roll, a cutting roll provided with a face of suitable material, a regulating roll arranged between the cutting roll and paste roll, means for adjustably supporting said regulating roll, a plurality of cutters arranged to coöperate with said cutting roll, means for regulating the pressure of the cutters upon the said cutting roll, a feeding roll arranged to coöperate with said cutting roll, and a cutting-off cutter movable lengthwise the cutting roll.

7. In a device of the kind described and in combination, a suitable frame, a paper carrier, a paste receptacle, means for adjustably supporting said receptacle from the frame, a paste roll arranged above said receptacle and projecting therein, means for rotating said paste roll, means arranged between the paste roll and said paper carrier for guiding the paper to the paste roll, comprising a plurality of rolls, each made up of a plurality of sections, a cutting roll provided with a face of suitable material, a regulating roll arranged between the cutting roll and paste roll, means for adjustably supporting said regulating roll, means for regulating the pressure of the cutters upon the said cutting roll, a sliced feeding roll arranged to coöperate with said cutting roll, and a cutting-off cutter movable lengthwise the cutting roll.

8. In a device of the kind described and in combination, a suitable frame, a paper carrier, a paste receptacle, means for adjustably supporting said receptacle from the frame, a paste roll arranged above said receptacle and projecting therein, means for rotating said paste roll, means arranged between the paste roll and said paper carrier for guiding the paper to the paste roll, a cutting roll provided with a face of suitable material, a regulating roll arranged between the cutting roll and paste roll, means for adjustably supporting said regulating roll, a plurality of cutters arranged to coöperate with said cutting roll, means for regulating the pressure of the cutters upon the said cutting roll, a feeding roll arranged to cooperate with said cutting roll, a cutting-off cutter movable lengthwise the cutting roll, and means for automatically piling and folding the trimmed paper.

9. In a device of the kind described and in combination, a suitable frame, a paper carrier, a paste receptacle, means for adjustably supporting said receptacle from the frame, a paste roll arranged above said receptacle and projecting therein, means for rotating said paste roll, means arranged between the paste roll and said paper carrier for guiding the paper to the paste roll, a cutting roll provided with a face of suitable material, a regulating roll arranged between the cutting roll and paste roll, means for adjustably supporting said regulating roll, a plurality of cutters arranged to coöperate with said cutting roll, means for regulating the pressure of the cutters upon the said cutting roll, means for indicating the length of paper pasted, means for indicating the positions of the cutters, means for indicating the position of the regulator roll, a feeding roll arranged to coöperate with said cutting roll, and a cutting-off cutter movable lengthwise the cutting roll.

10. In a wall paper preparing machine of the kind described and in combination, a suitable paste receptacle, means for adjustably supporting the same, a paste roll arranged thereabove and projecting into the paste receptacle, a supply roll arranged to carry a roll of wall paper, a plurality of paper alining rolls, a cutter roll provided with a suitable face, a regulator roll positioned proximate thereto, and arranged to coöperate therewith, a plurality of adjustable rotary cutters arranged in proximity to the cutter roll, means for regulating said cutters, a rotatable shaft provided with a plurality of roll sections slidably mounted thereon and rotatable therewith, a cut-off cutter, means for driving said paste roll, said regulator and cutter rolls and said shaft carrying said sectional roll, means for indicating the length of the trimmed paper, and adjustable means for guiding and piling the trimmed and pasted paper.

11. In a wall paper and preparing machine of the the kind described, and in combination, a suitable frame, a paste receptacle and adjustable support therefor, provided with means for elevating the receptacle to its support by a transverse movement of the receptacle, comprising parallel members extending from one side of the machine toward the other side, and upwardly inclined at said last mentioned side, and means for adjustably securing said members to the frame, a paste roll rotatably mounted in said frame above said receptacle and projecting therein, means detachably secured to the frame for carrying a roll of wall paper, alining means arranged between said roll and said paper carrier, a cutting roll provided with a suitable face, a regulator roll arranged between said paste roll and said cutting roll, a plurality of cutters arranged to coöperate with said cutting roll, adjustable means for maintaining said cutters in operative relation with the cutting roll, and a cutter adjustably mounted proximate the cutting roll, and movable lengthwise thereof, and means for simultaneously rotating the paste roll and the regulating and cutting rolls.

In testimony whereof, I have hereunto signed my name in the presence of two subscribing witnesses.

NESTOR HEADLAND.

Witnesses:
JOHN W. HILL,
ROY W. HILL.

Copies of this patent may be obtained for five cents each, by addressing the "Commissioner of Patents, Washington, D. C."